(12) United States Patent
Park et al.

(10) Patent No.: US 11,675,057 B2
(45) Date of Patent: *Jun. 13, 2023

(54) BEAM SCANNING APPARATUS AND OPTICAL APPARATUS INCLUDING THE SAME

(71) Applicant: SAMSUNG ELECTRONICS CO., LTD., Suwon-si (KR)

(72) Inventors: Junghyun Park, Seoul (KR); Jungwoo Kim, Hwaseong-si (KR); Byunggil Jeong, Anyang-si (KR); Changgyun Shin, Anyang-si (KR); Byounglyong Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 61 days.

This patent is subject to a terminal disclaimer.

(21) Appl. No.: 17/360,775

(22) Filed: Jun. 28, 2021

(65) Prior Publication Data

US 2021/0325517 A1 Oct. 21, 2021

Related U.S. Application Data

(63) Continuation of application No. 16/277,071, filed on Feb. 15, 2019, now Pat. No. 11,085,996.

(30) Foreign Application Priority Data

Jun. 19, 2018 (KR) .................. 10-2018-0070421

(51) Int. Cl.
*G01S 7/481* (2006.01)
*G02F 1/01* (2006.01)
(Continued)

(52) U.S. Cl.
CPC ............ *G01S 7/4817* (2013.01); *G01S 17/89* (2013.01); *G01S 17/90* (2020.01); *G02F 1/0102* (2013.01); *G02F 1/0121* (2013.01); *G02F 1/19* (2013.01)

(58) Field of Classification Search
CPC .......... G02F 1/01; G02F 1/011; G02F 1/0126; G02F 1/0102; G02F 1/0121; G02F 1/19;
(Continued)

(56) References Cited

U.S. PATENT DOCUMENTS 9,547,186 B2 1/2017 Han et al.
9,632,216 B2 4/2017 Han et al.
(Continued)

FOREIGN PATENT DOCUMENTS

JP 63088529 A 4/1988
JP 2012063230 A 3/2012
(Continued)

OTHER PUBLICATIONS

Park, et al., "Dynamic Reflection Phase and Polarization Control in Metasurfaces", Dec. 5, 2016, Nano Letters, vol. 17 (1), p. 407-413, 7 pages total.
(Continued)

*Primary Examiner* — Jie Lei
(74) *Attorney, Agent, or Firm* — Sughrue Mion, PLLC

(57) ABSTRACT

A beam scanning apparatus includes a light source configured to emit light, and a reflective phased array device configured to reflect the light emitted from the light source and incident on the reflective phased array device, and electrically adjust a reflection angle of the reflected light reflected by the reflective phased array device, wherein the light source and the reflective phased array device are disposed such the light is incident on the reflective phased
(Continued)

array device at an incidence angle with respect to a normal of a reflective surface of the reflective phased array device.

21 Claims, 17 Drawing Sheets

Related U.S. Application Data

(60) Provisional application No. 62/647,229, filed on Mar. 23, 2018.

(51) Int. Cl.
  *G02F 1/19* (2019.01)
  *G01S 17/89* (2020.01)
  *G01S 17/90* (2020.01)

(58) Field of Classification Search
  CPC . G02F 1/29; G02F 1/292; G02F 1/295; G02F 1/2955; G02F 2203/50; G02F 2203/12; G02B 5/00; G02B 5/008; G02B 26/00; G02B 26/02; G02B 26/08; G02B 5/288; G02B 5/281; G01S 17/90; G01S 17/89; G01S 17/895; G01S 7/481; G01S 7/4817
  USPC ............... 359/244, 298, 296, 299, 315, 316
  See application file for complete search history.

(56) References Cited

U.S. PATENT DOCUMENTS

| | | | |
|---|---|---|---|
| 11,085,996 B2 * | 8/2021 | Park | ................. G01S 17/90 |
| 2003/0039001 A1 | 2/2003 | King et al. | |
| 2012/0170097 A1 | 7/2012 | Han et al. | |
| 2014/0224989 A1 | 8/2014 | Long et al. | |
| 2016/0223723 A1 | 8/2016 | Han et al. | |
| 2017/0090221 A1 | 3/2017 | Atwater | |
| 2017/0153527 A1 | 6/2017 | Kim et al. | |
| 2017/0329014 A1 | 11/2017 | Moon et al. | |
| 2018/0059223 A1 | 3/2018 | Jeong et al. | |
| 2018/0136537 A1 | 5/2018 | Kim et al. | |

FOREIGN PATENT DOCUMENTS

| | | |
|---|---|---|
| JP | 2013120873 A | 6/2013 |
| JP | 2017157609 A | 9/2017 |
| KR | 10-2012-0077417 A | 7/2012 |
| KR | 1020160096527 A | 8/2016 |
| KR | 10-2017-0062096 A | 6/2017 |

OTHER PUBLICATIONS

Huang, et al., "Gate-tunable conducting oxide metasurfaces", 2016, Nano Letters, vol. 16, Issue 9, 13 pages total.

Communication dated Sep. 9, 2019 issued by the European Intellectual Property Office in counterpart European Application No. 19164385.7.

Communication dated Dec. 6, 2022 issued by the Japanese Patent Office in Japanese Application No. 2019-042783.

Communication dated Jan. 13, 2023 issued by the Korean Intellectual Property Office in Korean Application No. 10-2018-0070421.

* cited by examiner

BEAM SCANNING APPARATUS AND OPTICAL APPARATUS INCLUDING THE SAME

CROSS-REFERENCE TO RELATED APPLICATIONS

This application is a continuation of U.S. application Ser. No. 16/277,071, filed Feb. 15, 2019, which claims priority from U.S. Provisional Patent Application No. 62/647,229, filed on Mar. 23, 2018 in U.S. Patent and Trademark Office, and Korean Patent Application No. 10-2018-0070421, filed on Jun. 19, 2018 in the Korean Intellectual Property Office, the disclosures of which are incorporated herein in their entirety by reference.

BACKGROUND

1. Field

Example embodiments of the present disclosure relate to beam scanning apparatuses and optical apparatuses including the beam scanning apparatuses, and more particularly, to non-mechanical beam scanning apparatuses that use a reflective phased array and optical apparatuses including the non-mechanical beam scanning apparatuses.

2. Description of Related Art

Advanced driving assistance systems (ADAS) with various functions have been commercialized. For example, an increasing number of vehicles are equipped with functions such as an Adaptive Cruise Control (ACC) that recognizes a position and speed of another vehicle and reduces a speed of a corresponding vehicle if the risk of collision is low and drives the corresponding vehicle within a set speed range when there is no risk of collision or an Autonomous Emergency Braking System (AEB), which recognizes a preceding vehicle and prevents collision by automatically stopping if there is a risk of collision but the driver does not respond to it or if the response method is not appropriate. Also, commercialization of automobiles allowing autonomous driving in the near future is expected.

Accordingly, interest in an optical measuring apparatus capable of providing information about the surroundings of a vehicle is increasing. Light detection and ranging (LiDAR) for vehicles, for example, radiates a laser to a selected area around a vehicle and detects reflected lasers to provide information about distances with respect to objects in the vicinity of the vehicle, or relative speeds and azimuths of the objects. To this end, a LiDAR for vehicles includes a beam scanning apparatus capable of scanning light in a desired area. The beam scanning apparatus may also be used, other than for LiDAR for automobiles, for example, in LiDAR for robots, LiDAR for drones, security-purpose intruder surveillance systems, subway screen door obstacle detection systems, depth sensors, user face recognition sensors in mobile phones, augmented reality (AR), motion recognition and object profiling on televisions (TVs) or entertainment devices.

The beam scanning apparatus may be classified into a mechanical beam scanning apparatus and a non-mechanical beam scanning apparatus. For example, a mechanical scanning apparatus uses a method of rotating a light source itself, a method of rotating a mirror that reflects light, or a method of moving a spherical lens in a direction perpendicular to an optical axis. A non-mechanical scanning apparatus uses, for example, a method of using a semiconductor device and a method of electrically controlling an angle of reflected light by using a reflective phased array.

SUMMARY

One or more example embodiments provide beam scanning apparatuses and optical apparatuses including the beam scanning apparatuses.

Additional aspects will be set forth in part in the description which follows and, in part, will be apparent from the description, or may be learned by practice of example embodiments.

According to an aspect of an example embodiment, there is provided a beam scanning apparatus including a light source configured to emit light, and a reflective phased array device configured to reflect the light emitted from the light source and incident on the reflective phased array device, and electrically adjust a reflection angle of the reflected light reflected by the reflective phased array device, wherein the light source and the reflective phased array device are disposed such the light is incident on the reflective phased array device at an incidence angle with respect to a normal of a reflective surface of the reflective phased array device.

The light source and the reflective phased array device may be disposed such that the light incident on the reflective phased array device and the reflected light reflected by the reflective phased array device do not overlap each other.

The reflective phased array device may include a plurality of antenna resonators, each of the plurality of antenna resonators being independently driven.

The plurality of antenna resonators may each include an electrode layer, an active layer disposed on the electrode layer, an insulating layer disposed on the active layer opposite to the electrode layer, and an antenna layer disposed on the insulating layer opposite to the active layer.

The electrode layer may include a conductive metal configured to reflect the light emitted from the light source.

The antenna layer may have a fishbone shape and may include a first antenna portion extending in a first direction and a plurality of second antenna portions disposed along the first direction and extending in a second direction from the first antenna portion.

The reflected light may include directly reflected light that is directly reflected by the reflective phased array device and resonated scattered light that is generated based on resonance in each of the plurality of antenna resonators of the reflective phased array device, and wherein a length of each of the plurality of second antenna portions in the first direction is determined such that an intensity of the directly reflected light is equal to an intensity of the resonated scattered light.

The beam scanning apparatus, wherein the length of each of the plurality of second antenna portions in the first direction may be determined based on the incidence angle of the light.

The beam scanning apparatus, wherein the antenna layer may include a plurality of antenna layers, and wherein each of the plurality of antenna layers extends in a first direction and are disposed at predetermined intervals in a second direction perpendicular to the first direction.

The reflected light may include directly reflected light that is directly reflected by the reflective phased array device and resonated scattered light that is generated based on resonance in each of the plurality of antenna resonators of the reflective phased array device, wherein at least one of an interval between the plurality of antenna layers in the second direction and an antenna period is determined such that an intensity of the directly reflected light is equal to an intensity of the resonated scattered light and, wherein the antenna period is a length at which the plurality of antenna layers are repeated in the second direction.

The interval between at least one of the plurality of antenna layers or the antenna period may be determined based on the incidence angle of the light incident on the reflective phased array device.

The beam scanning apparatus, wherein at least one of the interval between the plurality of antenna layers and the antenna period may be less than an interval between a plurality of antenna layers or an antenna period corresponding to light perpendicularly incident on the reflective phased array device.

As the incidence angle of the light incident on the reflective phased array device increases, at least one of the interval between the plurality of antenna layers or the antenna period may decrease.

The beam scanning apparatus, wherein at least one of an interval between the plurality of antenna layers and an antenna period may be determined such that an intensity of the directly reflected light is equal to an intensity of the resonated scattered light based on a voltage applied to the reflective phased array device and a wavelength of the light on the reflective phased array device.

The light source and the reflective phased array device may be disposed such that a travelling direction of the light is parallel to the first direction.

The light source may include a first light source configured to emit first incident light that is incident on the reflective phased array device at a first incidence angle with respect to the normal of the reflective surface of the reflective phased array device and a second light source configured to emit second incident light that is incident on the phased array device at a second incidence angle different from the first incidence angle.

The beam scanning apparatus, wherein first reflected light generated by the first incident light reflected by the reflective phased array device travels at a first reflection angle with respect to the normal of the reflective surface of the reflective phased array device, and second reflective light generated by the second incident light reflected by the reflective phased array device travels at a second reflection angle, different from the first reflection angle, with respect to the normal of the reflective surface of the reflective phased array device, and wherein the beam scanning apparatus may further include an optical element disposed on a travelling path of the second reflected light and configured to change a travelling direction of the second reflected light.

The light source and the reflective phased array device may be disposed such that a travelling direction of the light incident on the reflective phased array device is parallel to the second direction.

The beam scanning apparatus, wherein a scanning plane including reflected lights reflected by the reflective phased array device at different angles may be perpendicular to the first direction.

The beam scanning apparatus, wherein, when the incidence angle of the incident light is $\theta i$ and a reflection angle of central reflected light with respect to the normal of the reflective surface of the reflective phased array device is $\theta r$, the phased array device is configured such that a maximum steering angle $\theta s$ of the reflective phased array device with respect to the central reflected light may satisfy $\partial r - \theta s > \theta i$.

The beam scanning apparatus, wherein, when an interval between the plurality of antenna layers in the second direction or an antenna period is p, an incidence angle of incident light with respect to the normal of the reflective surface of the reflective phased array device is $\theta i$, and a reflection angle of central reflected light with respect to the normal of the reflective surface of the reflective phased array device is $\theta r$, where $\lambda$ is a wavelength of the incident light, the reflective phased array device is configured such that a maximum steering angle $\theta s$ of the reflective phased array device with respect to the central reflected light may satisfy $\theta i > 0.5 \theta s = 0.5 \sin^{-1}(\lambda/2p)$, and the antenna period is a length at which the plurality of antenna layers are repeated in the second direction.

The reflective phased array device may include a plurality of antenna layers, and the plurality of antenna layers may be disposed at a first interval in a first direction and at a second interval in a second direction perpendicular to the first direction.

The reflected light may include directly reflected light that is directly reflected by the reflective phased array device and resonated scattered light generated based on resonance in each of the antenna resonators of the reflective phased array device, and wherein the first interval and the second interval between the plurality of antenna layers may be determined such that an intensity of the directly reflected light is equal to an intensity of the resonated scattered light.

According to an aspect of an example embodiment, there is provided an optical apparatus including a light source configured to emit light, a reflective phased array device configured to reflect the emitted light from the light source and incident on the reflective phased array device, and electrically adjust a reflection angle of the reflected light reflected by the reflective phased array, and a light detector configured to detect light reflected by an external object which is irradiated with the reflected light from the reflective phased array device, wherein the light source and the reflective phased array device are disposed such that the light is incident on the reflective phased array device at an incidence angle with respect to a normal of a reflective surface of the reflective phased array device.

The optical apparatus may further include a controller configured to determine position information of the external object based on the detection of the light reflected by the external object by the light detector.

The optical apparatus may include a distance sensor, a three-dimensional sensor, or a vehicle radar.

According to an aspect of an example embodiment, there is provided a beam scanning apparatus including a light source configured to emit light, and a reflective phased array device configured to reflect the light emitted from the light source and incident on the reflective phased array device, and electrically adjust a reflection angle of the reflected light reflected by the reflective phased array device, the reflective phased array device including a plurality of antenna layers, wherein the light source and the reflective phased array device are disposed such the incident light is incident on the reflective phased array device from the light source at an incident angle with respect to a normal of a reflective surface of the reflective phased array device, wherein the reflected light includes directly reflected that is directly reflected by the reflective phased array device and resonated scattered light generated based on resonance in each of a plurality of antenna resonators of the reflective phased array device, and wherein at least one of an interval between the plurality of antenna layers or an antenna period is determined such that an intensity of the directly reflected light is equal to an intensity of the resonated scattered light.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
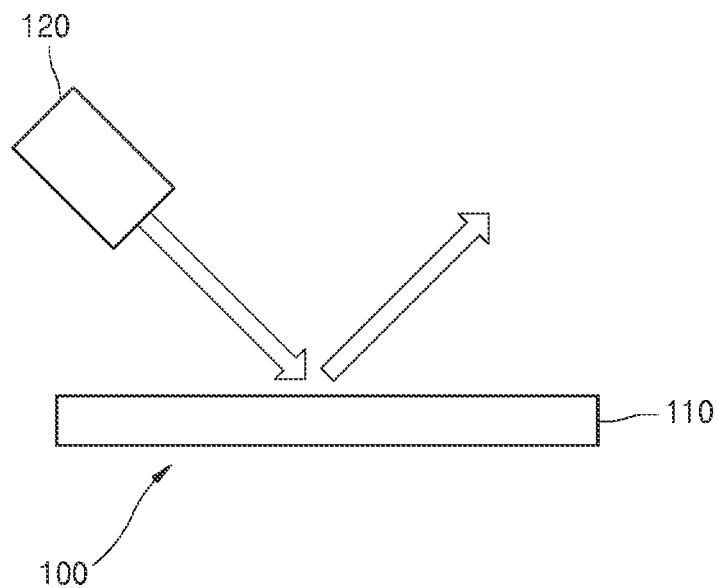
FIG. 1 is a cross-sectional view of a schematic structure of a beam scanning apparatus according to an example embodiment.

Hereinafter, a beam scanning apparatus and an optical apparatus including the beam scanning apparatus will be described in detail with reference to the accompanying drawings. Throughout the drawings, like reference numerals refer to like elements, and each element may be exaggerated in size for clarity and convenience of description. The example embodiments are merely illustrative, and various modifications may be possible from the example embodiments. In a layer structure described below, an expression such as "above" or "on" may include not only the meaning of "arrangement of an element immediately on, under or on the left side or on the right side of another element in a contact manner", but also the meaning of "arrangment of an element on, under, on the left side or on the right side of another element in a non-contact manner."

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is a cross-sectional view of a schematic structure of a beam scanning apparatus 100 according to an example embodiment. Referring to FIG. 1, the beam scanning apparatus 100 according to an example embodiment may include a light source 120 emitting light and a reflective phased array device 110 reflecting light emitted from the light source 120 and electrically controlling a reflection angle of the reflected light. The light source 120 may be, for example, a laser diode (LD) or a light emitting diode (LED) emitting near infrared rays in a band of about 800 nm to about 1500 nm, but embodiments are not limited thereto.

According to the present example embodiment, the light source 120 and the reflective phased array device 110 may be arranged such that a travelling direction of light emitted from the light source 120 incident on the reflective phased array device 110 is inclined with respect to a normal of a reflective surface of the reflective phased array device 110. For example, as illustrated in FIG. 1, the light source 120 may be arranged such that an optical axis of the light source 120 is inclined with respect to a surface of the reflective phased array device 110.

Figure 2:
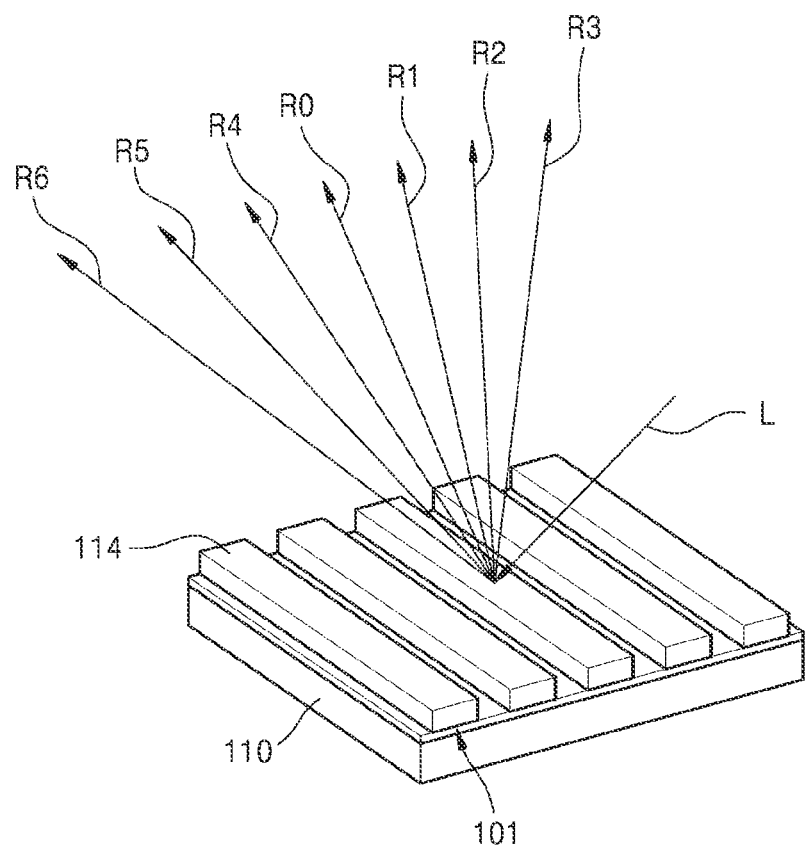
FIG. 2 is a perspective view illustrating a schematic structure and operation of a beam scanning apparatus according to an example embodiment.

FIG. 2 is a perspective view illustrating a schematic structure and operation of the beam scanning apparatus 100 according to an example embodiment. Referring to FIG. 2, the reflective phased array device 110 may include a plurality of antenna resonators 101 that are independently operated. Each of the antenna resonators 101 may include an antenna layer 114 extending in a first direction. The plurality of antenna layers 114 may be arranged at regular intervals in a second direction perpendicular to the first direction. According to the example embodiment, a direction in which incident light L is reflected may be adjusted according to combinations of voltages applied to the plurality of antenna resonators 101.

Figure 3:
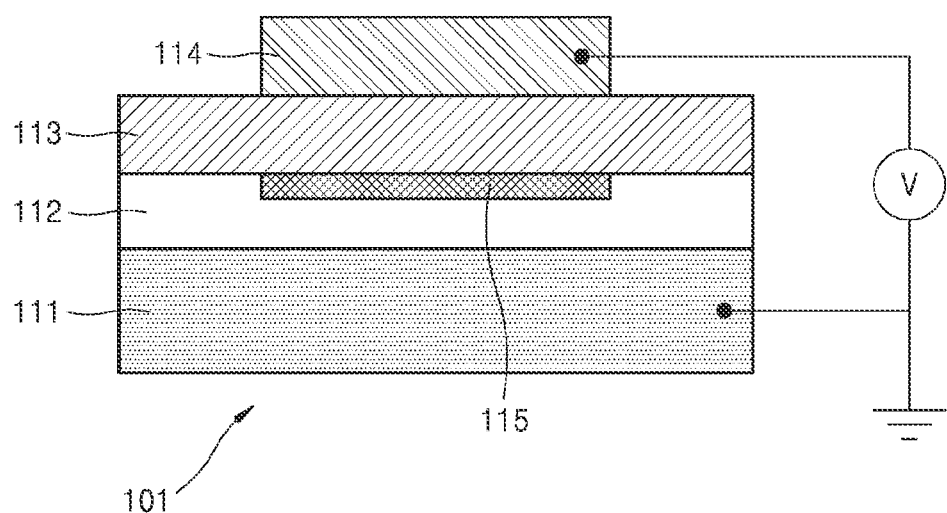
FIG. 3 is a schematic cross-sectional view of a schematic structure of a phased array device of the beam scanning apparatus illustrated in FIG. 1.

For example, FIG. 3 is a cross-sectional view of a schematic structure of an antenna resonator 101 of the reflective phased array device 110 of the beam scanning apparatus 100 illustrated in FIG. 1. Referring to FIG. 3, each of the antenna resonators 101 includes an electrode layer 111, an active layer 112 arranged on the electrode layer 111, an insulating layer 113 arranged on the active layer 112, and an antenna layer 114 in nanoscale arranged on the insulating layer 113. FIG. 3 illustrates one antenna layer 114 arranged on the insulating layer 130, but embodiments are not limited thereto, and the antenna resonators 101 may include a plurality of antenna layers 114 arranged on the insulating layer 113 at regular intervals.

The electrode layer 111 may operate as a common electrode and may be formed of a conductive material. The electrode layer 111 may also be formed of a material that reflects light emitted from the light source 120. For example, the electrode layer 111 may be formed of a metal such as copper (Cu), aluminum (Al), nickel (Ni), iron (Fe), cobalt (Co), zinc (Zn), titanium (Ti), ruthenium (Ru), rhodium (RH), palladium (Pd), platinum (Pt), silver (Ag), osmium (Os), iridium (Ir), gold (Au) or an alloy thereof, or include a metal nano-particle-dispersed thin film of gold (Au) or silver (Ag). In addition, the electrode layer 111 may also include a carbon nanostructure or a conductive polymer material, other than metals.

The antenna layer 114 may operate as an antenna with respect to light, may generate localized surface plasmon resonance with respect to light of a predefined wavelength, and capture and discharge energy thereof. Surface plasmon resonance is a phenomenon in which a very high electric field is generated locally on a metal surface due to collective oscillation of free electrons in a metal when light is incident on the metal. Surface plasmon resonance may generally occur at an interface between metal and non-metal. To this end, the antenna layer 114 may be formed of a metal material having excellent conductivity, such as gold (Au), silver (Ag), copper (Cu), aluminum (Al), or platinum (Pt). A size and shape of the antenna layer 114 may vary depending on a wavelength of incident light. For example, a size of the antenna layer 114 may be less than a wavelength of light emitted from the light source 120. For example, when an operating wavelength of light emitted from the light source 120 is visible light or near-infrared light, a width or length of the antenna layer 114 may be about 400 nm or less. In addition, while the antenna layer 114 may have a simple rod shape, embodiments are not limited thereto, and the antenna layer 114 may have various patterns such as a circular, elliptical, or cross shape.

The insulating layer 113 electrically insulates the antenna layer 114 from the active layer 112 and the electrode layer 111. For example, the insulating layer 113 may be an oxide film such as hafnium dioxide ($HfO_2$), silicon dioxide ($SiO_2$), aluminum oxide ($Al_2O_3$), titanium dioxide ($TiO_2$), zirconium oxide (ZrO), or the like, or a nitride film such as silicon nitride (SiNx).

The active layer 112 may operate to change resonance characteristics of the antenna layer 114 as a charge density within the active layer 112 is changed by an electric signal, for example, an electric field formed between the electrode layer 111 and the antenna layer 114. For example, a charge accumulation layer or a charge depletion layer 115 may be formed in the active layer 112 by the electric field formed between the electrode layer 111 and the antenna layer 114 to change resonance conditions and thereby change a phase of reflected light. The active layer 112 may be formed of a material selected from the group consisting of crystalline materials such as potassium tantalate niobate (KTN), lithium niobium trioxide ($LiNbO_3$), and lead zirconate titanate (PZT); zinc oxide (ZnO)-based materials such as indium tin oxide (ITO), indium zinc oxide (IZO), aluminum zinc oxide (AZO), gallium zinc oxide (GZO), or gallium indium zinc oxide (GIZO); transition metal nitrides such as titanium nitride (TiN), zirconium nitirde (ZrN), hafnium nitride (HfN) or tantalum nitride (TaN); and semiconductor materials such as silicon (Si), a-Si, or a Group III-V compound semiconductor.

In the beam scanning apparatus 100 having the above-described structure, a charge density within the active layer 112 varies according to an intensity of an electrical field between the electrode layer 111 and the antenna layer 114. As a common voltage is applied to the electrode layer 111, particularly according to a distribution of a voltage applied to a plurality of antenna layers 114, a charge density distribution in the active layer 112 may vary. Variation in the charge density in the active layer 112 may modify resonance characteristics of the antenna layer 114, and the modified resonance characteristics may cause phase shift of light reflected by the antenna layer 114, thereby varying a phase of the reflected light. Accordingly, as a phase shift distribution of reflected light is determined based on a distribution of a voltage applied to the plurality of antenna layers 114 arranged adjacent to each other, a travelling direction of reflected light may be controlled by adjusting a voltage applied to the plurality of antenna layers 114. The beam scanning apparatus 100 may reflect incident light in the above-described manner to electrically scan reflected light in a desired direction.

Referring back to FIG. 2, incident light L emitted from the light source 120 is incident on a surface normal of the reflective phased array device 110 at an angle. For example, while proceeding in a direction parallel to a first direction in which each of the antenna layers 114 extends, the incident light L may be incident on a surface of the reflective phased array device 110 at an angle. Then, reflected light reflected by the phased array device 110 may be reflected at a reflection angle which is symmetrical to an incidence angle of the incident light L with respect to the surface normal of the reflective phased array device 110.

When no voltage is applied to the phased array device 110, a travelling direction of the incident light L is not changed, and thus, reflected light R0 proceeding in a direction parallel to the first direction is generated. Hereinafter, the reflected light R0 will be referred to as central reflected light. On the other hand, when a voltage is applied to the phased array device 110, a travelling direction of the incident light L is changed in an azimuth direction, and reflected lights R1 through R6 proceeding in a direction inclined with respect to the first direction are generated. An inclination degree with respect to the first direction, that is, an angle in an azimuth direction, may vary according to combinations of voltages applied to the plurality of antenna resonators 101 of the phased array device 110. Also, when a travelling direction of incident light L is changed in an azimuth direction, a reflection angle with respect to a surface normal of the phased array device 110 is maintained constant. Thus, in the example embodiment illustrated in FIGS. 1 and 2, the beam scanning apparatus 100 scans a beam in an azimuth direction.

According to the example embodiment, the incident light L incident from the light source 120 to the phased array device 110 and the reflected lights R0 through R6 reflected by the phased array device 110 do not overlap and mix with each other. Accordingly, there is no limitation in areas to be scanned by the beam scanning apparatus 100. In addition, there is no need to use a beam splitter to separate the incident light L and the reflected lights R0 through R6 from each other, and thus, a beam may be scanned or the reflected lights R0 through R6 may be detected without loss of light. Therefore, as light utilization efficiency may be increased, a detectable range may be increased, and power consumption of the beam scanning apparatus 100 may be reduced.

Figure 4A:
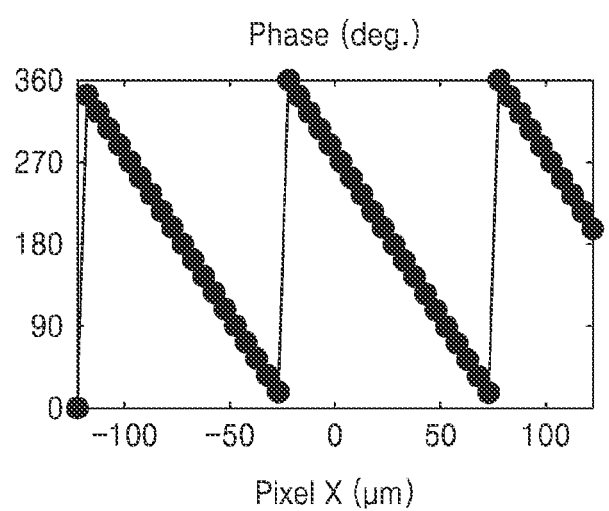
FIG. 4A is a graph showing an example of phase shift distribution of a reflective phase shift of reflected light of a phased array device.
Figure 4B:
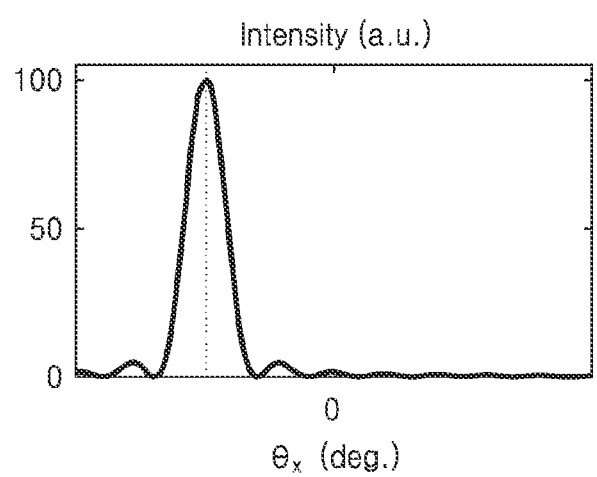
FIG. 4B is a graph showing an example of a steering angle distribution of the reflected light.
Figure 5A:
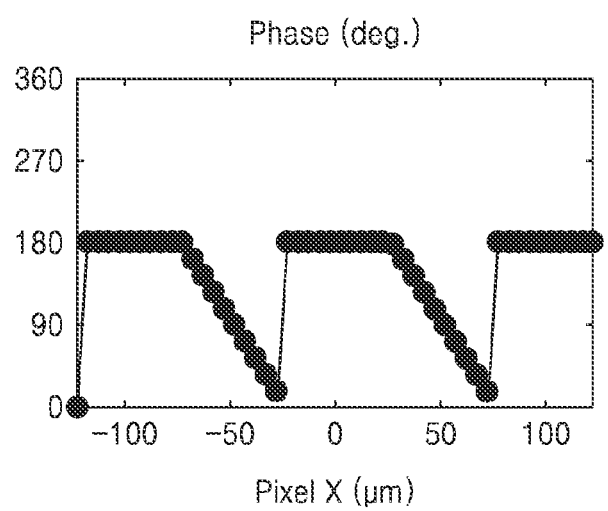
FIG. 5A is a graph showing an example of phase shift distribution of a reflective phase shift of reflected light of a phased array device.
Figure 5B:
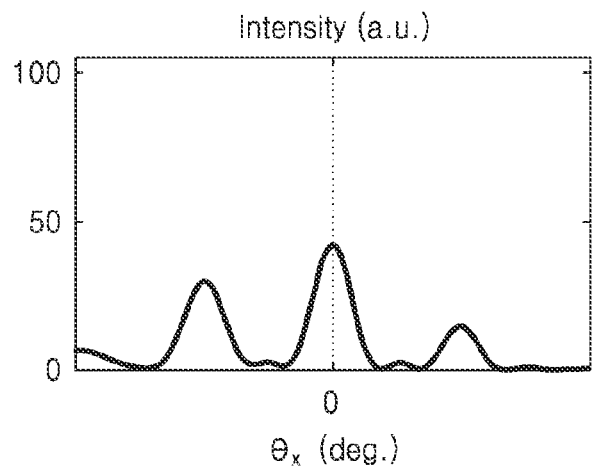
FIG. 5B is a graph showing an example of a steering angle distribution of the reflected light.

For a more accurate beam scanning, a greater phase shift width of reflected light by the phased array device 110 may be advantageous when incident light L is incident at an angle. In other words, a phase of reflected light may preferably be shifted from 0 degrees up to 360 degrees. For example, FIG. 4A is a graph showing an example of a phase shift distribution of a relatively large reflective phase shift of reflected light of a phased array device, for example, when a phase shift from 0 degrees to 360 degrees is possible, and FIG. 4B is a graph showing an example of a steering angle distribution of the reflected light. FIG. 5A is a graph showing an example of a phase shift distribution of a relatively insufficient reflective phase shift of reflected light of the phased array device 110, for example, when a phase shift only from 0 degrees to 180 degrees is possible, and FIG. 5B is a graph showing an example of a steering angle distribution of the reflected light. Referring to FIG. 4B, when the phased array device 110 expresses a phase shift of reflected light from 0 degrees to 360 degrees, most beams concentrate within an intended angle range, and thus, a beam may be more accurately steered to a desired position. On the other hand, when the phased array device 110 expresses a phase shift of reflected light only from 0 degrees to 180 degrees, as illustrated in FIG. 5B, a ratio of lateral light other than a beam steered at an intended angle increases, thereby causing performance deterioration of reduced directivity and a lower signal-to-noise ratio.

In order for the phased array device 110 to express a phase shift of reflected light from 0 degrees up to 360 degrees, the phased array device 110 may be designed to satisfy critical coupling conditions with respect to incident light. The critical coupling conditions may be conditions under which direct reflection and resonant scattering in the phased array device 110 have an equal ratio from among light emitted from the phased array device 110. If direct reflection is greater, under-coupling occurs, and if resonant scattering is greater, over-coupling occurs and reduces an extent of phase modulation of the phased array device 110.

Figure 6:
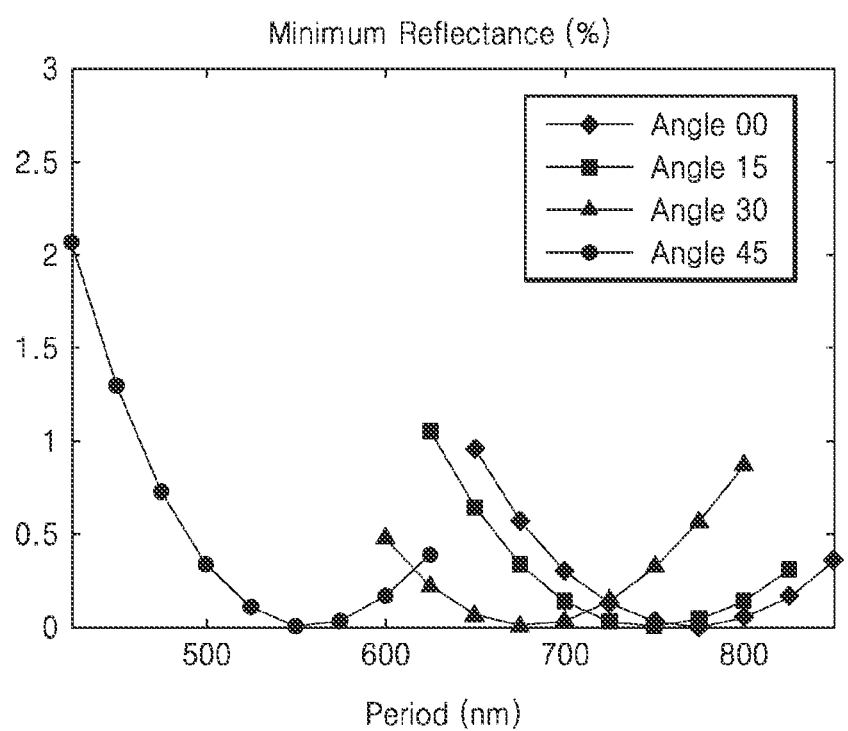
FIG. 6 is a graph showing a variation in a minimum reflectivity according to an antenna period of a phased array device and an incidence angle of incident light.
Figure 7:
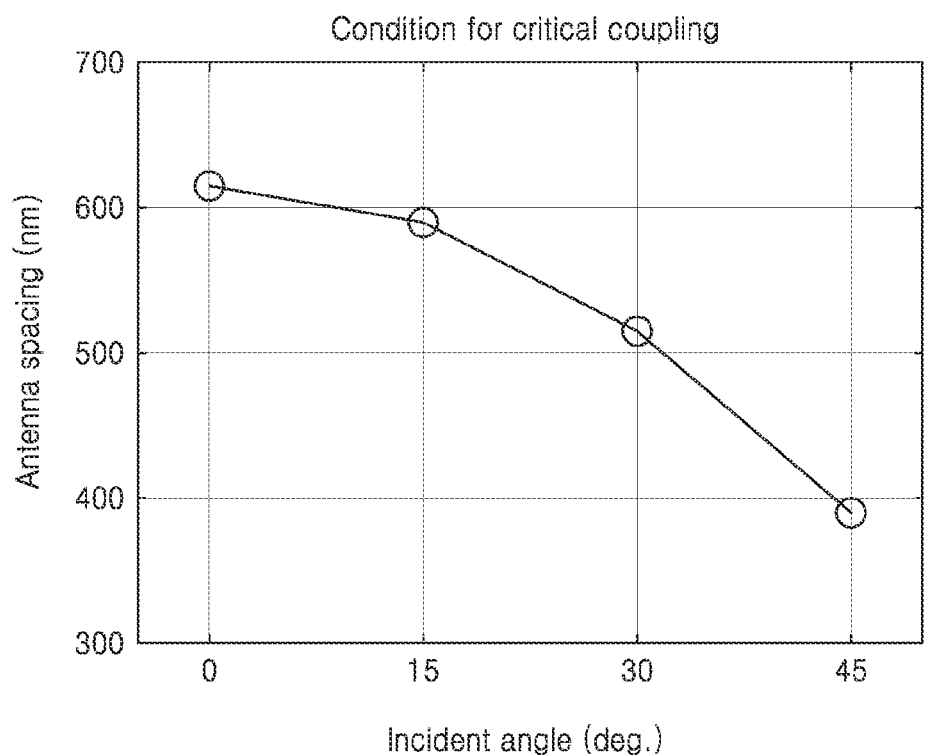
FIG. 7 is a graph showing a variation in a critical coupling condition according to an interval between antennas of a phased array device and an incidence angle of incident light.
Figure 8:
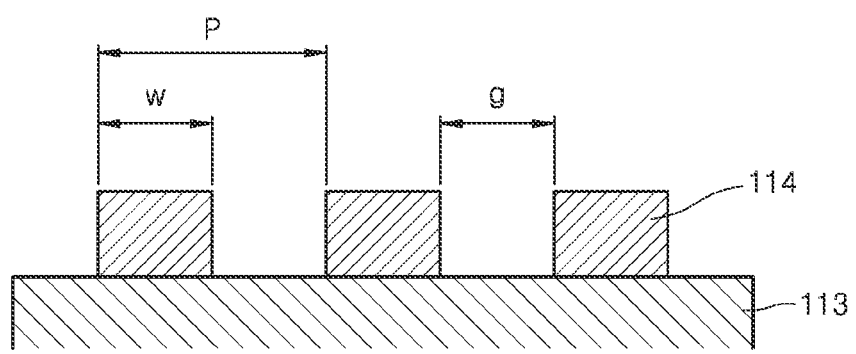
FIG. 8 is a cross-sectional view of an example of an antenna period and an interval between antennas of a phased array device according to an example embodiment.

The critical coupling conditions vary according to an incidence angle of incident light, and thus, the phased array device 110 may be designed by considering the incidence angle of incident light. For example, FIG. 6 is a graph showing a variation in a minimum reflectivity according to an antenna period of the phased array device 110 and an incidence angle of incident light. FIG. 7 is a graph showing a variation in a critical coupling condition according to an interval between antennas of the phased array device 110 and an incidence angle of incident light; and FIG. 8 is a cross-sectional view of an example of an antenna period and an interval between antennas of the phased array device 110. An antenna period of the phased array device 110 and an interval between the antenna layers 114 may be defined as illustrated in FIG. 8. Referring to FIG. 8, an antenna period p of the phased array device 110 is a length whereby the antenna layers 114 are each repeated, and an interval g between the antenna layers 114 is a distance between two adjacent antenna layers 114. In addition, a width w of the antenna layer 114 is a length of one antenna layer 114 in a second direction. The antenna period p may be equal to a sum of the width w of the antenna layer 114 and the interval g between the antenna layers 114.

Referring back to FIG. 6, at an incidence angle of 0 degree, that is, when incident light is incident perpendicularly on a reflection surface of the phased array device 110, resonance occurs at an antenna period p of the phased array device 110 of about 780 nm with minimized reflectivity. The higher the incidence angle, that is, as incident light is incident on a reflection surface of the phased array device 110 at a higher inclination degree with respect to the surface normal of the phased array device 110, the antenna period p providing a minimum reflectivity decreases. For example, at an incidence angle of 45 degrees, resonance occurs at the antenna period p of the phased array device 110 of about 550 nm with minimized reflectivity. In addition, referring to FIG. 7, as an incidence angle increases, an interval g between the antenna layers 114 of the phased array device 110 at which critical coupling occurs decreases. For example, at an incidence angle of 0 degree, critical coupling occurs at an interval g between the antenna layers 114 of about 600 nm or greater. However, at an incidence angle of 45 degrees, critical coupling occurs at an interval g between the antenna layers 114 of about 400 nm or less.

Accordingly, in a configuration in which incident light is incident on the phased array device 110 at an angle, by considering an incidence angle of the incident light, compensation design of reducing the antenna period p and the interval g between the antenna layers 114 to be less than when incident light is perpendicularly incident on the phased array device 110 may be made. Without compensation design as described above, a ratio of lateral light other than beams that are steered at an intended angle increases, and this may reduce directivity and decrease a signal-to-noise ratio, as illustrated in FIG. 5B.

Figure 9:
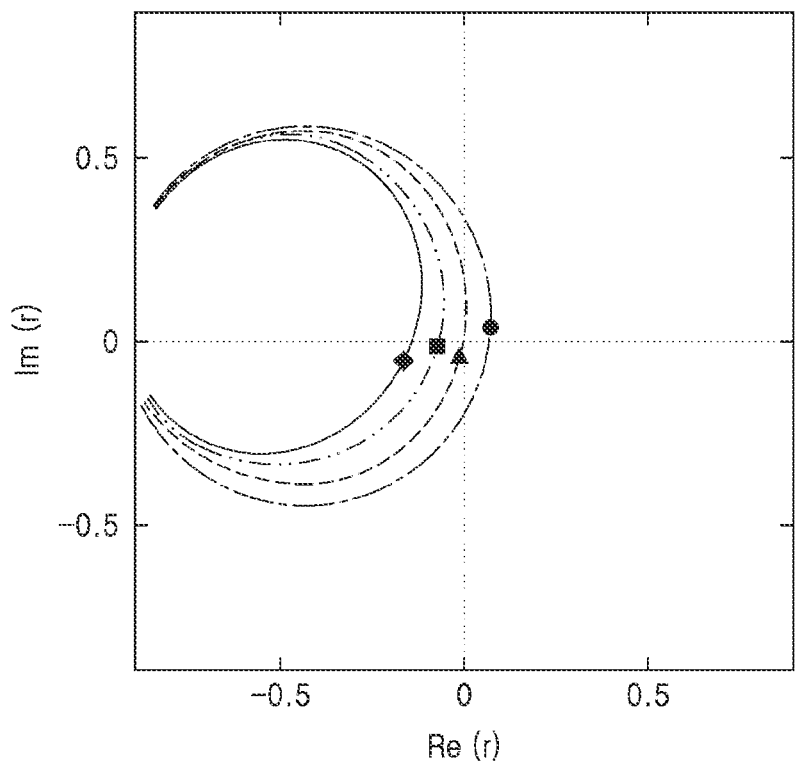
FIG. 9 is a graph showing a reflection coefficient on a complex plane at an incidence angle of incident light of 0 degree according to an example embodiment.
Figure 10:
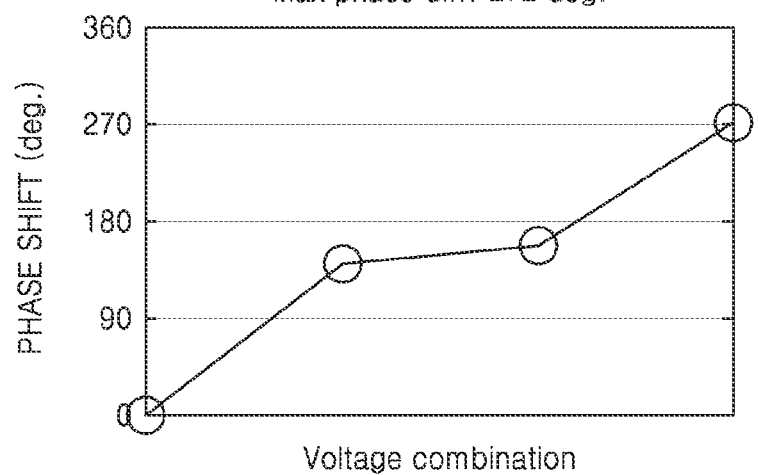
FIG. 10 is a graph showing an example of a reflection phase of reflected light in a phased array device at an incidence angle of incident light of 0 degree according to an example embodiment.

FIG. 9 is a graph showing an example of a reflection coefficient on a complex plane at an incidence angle of incident light of 0 degree. FIG. 10 is a graph of an example of a reflective phase of reflected light in a phased array device 110 at an incidence angle of incident light of 0 degree. In the graphs of FIGS. 9 and 10, it is assumed that an interval g between the antenna layers 114 is 150 nm, and a width w of each antenna layer 114 is 160 nm.

In FIG. 9, a circle marked with '-♦-' indicates a trail of a reflection coefficient according to variation in a wavelength of incident light when a voltage of +4 V is applied to each of the antenna layer 114 and the electrode layer 111, and a position of figure '♦' is a position of the reflection coefficient when a wavelength of incident light is 1.4 μm. In addition, a circle marked with '-■-' indicates a trail of a reflection coefficient according to variation in a wavelength of incident light when voltages of −4 V and +4 V are respectively applied to the antenna layer 114 and the electrode layer 111, and a position of figure '■' is a position of the reflection coefficient when a wavelength of incident light is 1.4 μm. In addition, a circle marked with '-▲-' indicates a trail of a reflection coefficient according to variation in a wavelength of incident light when a voltage of 0 V is applied to each of the antenna layer 114 and the electrode layer 111, and a position of figure '▲' is a position of the reflection coefficient when a wavelength of incident light is 1.4 μm. Finally, a circle marked with '-●-' indicates a trail of a reflection coefficient according to variation in a wavelength of incident light when a voltage of −4 V is applied to each of the antenna layer 114 and the electrode layer 111, and a position of figure '●' is a position of the reflection coefficient when a wavelength of incident light is 1.4 μm.

Referring to FIG. 10, a reflection phase of reflected light corresponding to when voltages of 0 V and 0 V are respectively applied to the antenna layer 114 and the electrode layer 111 is defined as 0 degree, and a reflection phase of reflected light corresponding to when voltages of −4 V and −4 V are respectively applied to the antenna layer 114 and the electrode layer 111, a reflection phase of reflected light corresponding to when voltages of −4 V and +4 V are respectively applied, and a reflection phase of reflected light corresponding to when voltages of +4 V and +4 V are respectively applied are sequentially illustrated. For example, when voltages of +4 V and +4 V are respectively applied to the antenna layer 114 and the electrode layer 111, a reflection phase of reflected light is about 272 degrees. Accordingly, when incident light having a wavelength of 1.4 μm is perpendicularly incident on a phased array device 110 in which the interval g between the antenna layers 114 is 150 nm and the width w of the antenna layer 114 is 160 nm, the phased array device 110 may express a phase shift of reflected light from 0 degrees to 272 degrees.

Figure 11:
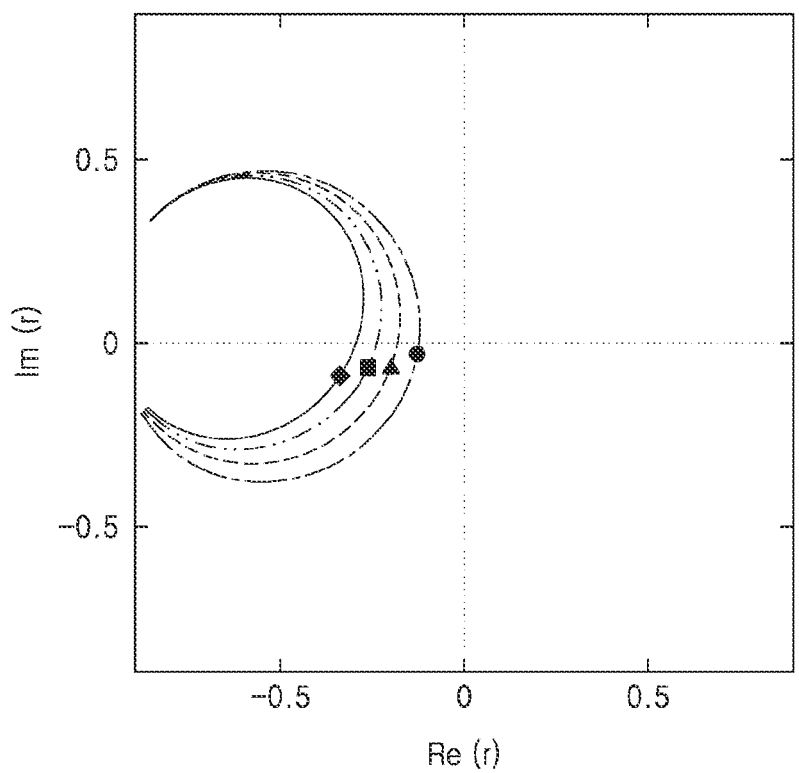
FIG. 11 is a graph showing a reflection coefficient on a complex plane at an incidence angle of incident light of 45 degrees without antenna compensation design.
Figure 12:
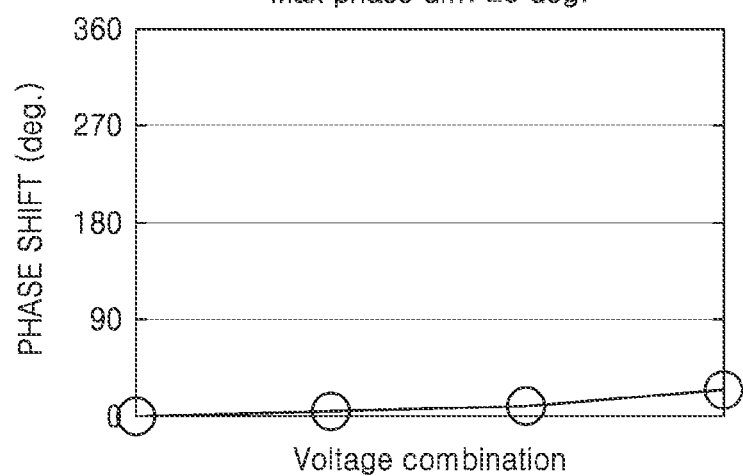
FIG. 12 is a graph showing an example of a reflection phase of reflected light in a phased array device at an incidence angle of incident light of 45 degrees without antenna compensation design.

FIG. 11 is a graph showing a reflection coefficient on a complex plane at an incidence angle of incident light of 45 degrees without antenna compensation design. FIG. 12 is a graph showing an example of a reflection phase of reflected light in a phased array device 110 at an incidence angle of incident light of 45 degrees without compensation design. In other words, FIGS. 11 and 12 show an example embodiment where the interval g between the antenna layers 114 and the width w of the antenna layer 114 are respectively maintained at 150 nm and 160 nm, and incident light having a wavelength of 1.4 μm is emitted and incident on a phased array device 110 at 45 degrees with respect to the surface normal of the phased array device 110. Referring to FIG. 12, when voltages of +4 V and +4 V are respectively applied to the antenna layer 114 and the electrode layer 111, a phase shift of reflected light is about 25 degrees. Accordingly, when incident light having a wavelength of 1.4 μm is incident on the phased array device 110 in which the interval g between the antenna layers 114 is 150 nm and the width w of the antenna layer 114 is 160 nm, at 45 degrees, the phased array device 110 may show a phase shift of reflected light only from 0 degrees to 25 degrees.

Figure 13:
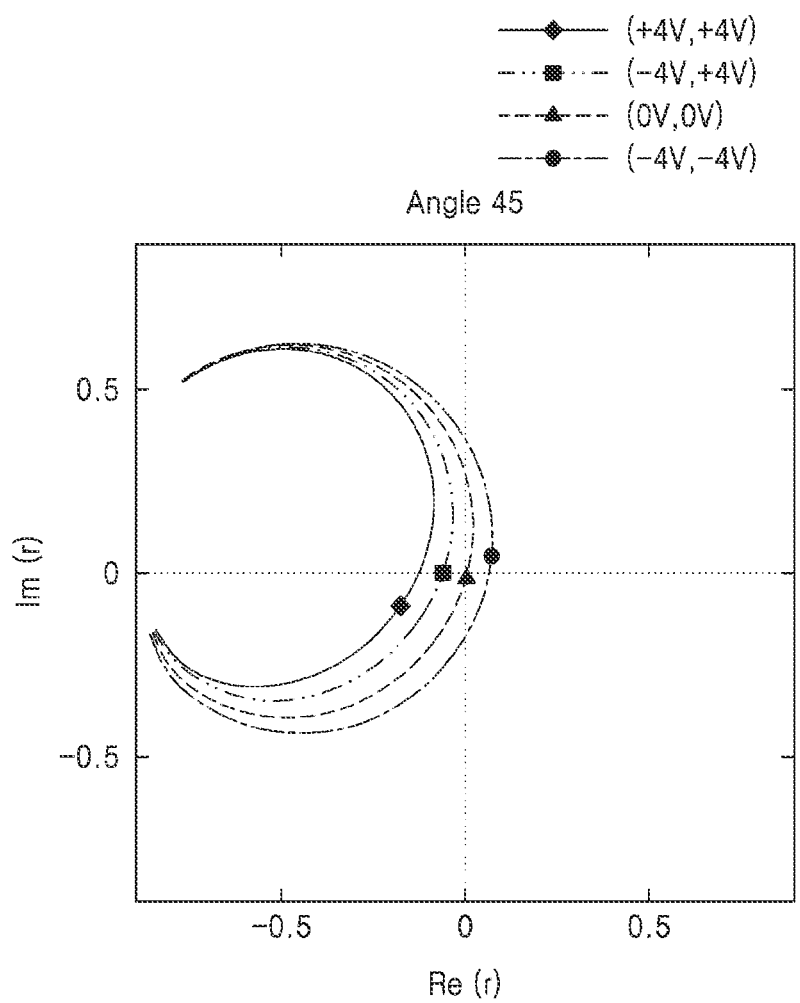
FIG. 13 is a graph showing a reflection coefficient on a complex plane at an incidence angle of incident light of 45 degrees with antenna compensation design according to an example embodiment.
Figure 14:
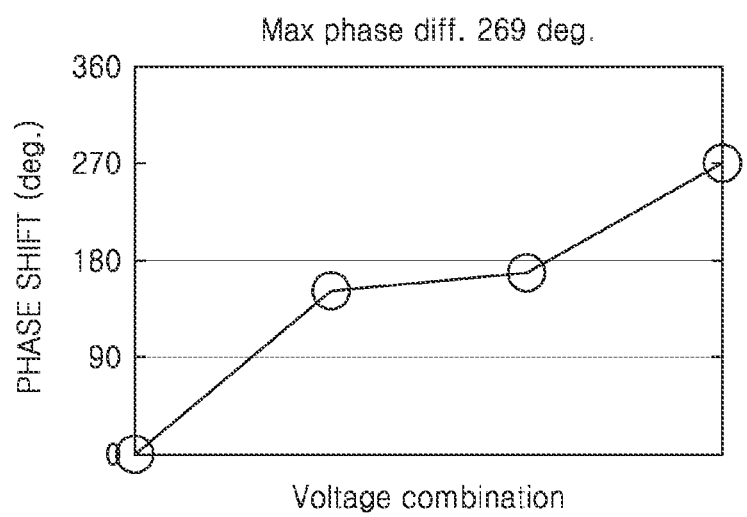
FIG. 14 is a graph showing an example of a reflection phase of reflected light in a phased array device at an incidence angle of incident light of 45 degrees when antenna compensation design is provided according to an example embodiment.

FIG. 13 is a graph showing a reflection coefficient on a complex plane at an incidence angle of incident light of 45 degrees with antenna compensation design, and FIG. 14 is a graph showing an example of a reflection phase of reflected light in a phased array device 110 at an incidence angle of incident light of 45 degrees with antenna compensation design. FIGS. 13 and 14 show an example embodiment in which the interval g between the antenna layers 114 and the width w of the antenna layer 114 are respectively reduced to 60 nm and 152 nm, and incident light having a wavelength of 1.4 μm is emitted and incident on a phased array device 110 at 45 degrees. Referring to FIG. 14, when voltages of +4 V and +4 V are respectively applied to the antenna layer 114 and the electrode layer 111, a phase shift of reflected light is about 269 degrees. Accordingly, when incident light having a wavelength of 1.4 μm is incident on the phased array device 110 in which the interval g between the antenna layers 114 is 60 nm and the width w of the antenna layer 114 is 152 nm, at 45 degrees, the phased array device 110 may show a phase shift of reflected light from 0 degrees up to 269 degrees. Accordingly, by performing compensated design of antennas, similar performance of phase shift may be maintained as when incident light having a wavelength of 1.4 μm is perpendicularly incident on the phased array device 110 in which the interval g between the antenna layers 114 is 150 nm and the width w of the antenna layer 114 is 160 nm.

Meanwhile, the critical coupling conditions may also be affected by a wavelength of incident light and amplitude of a voltage applied to the phased array device 110. For example, referring to FIGS. 9 through 14, voltages from −4 V to +4 V were applied, and the wavelength of incident light was 1.4 μm. However, when voltages to be applied and a wavelength of incident light are varied, the integral g between the antenna layers 114 and the width w of the antenna layer 114 may be selected to satisfy the critical coupling conditions by considering the varied voltages and the varied wavelength.

Figure 15:
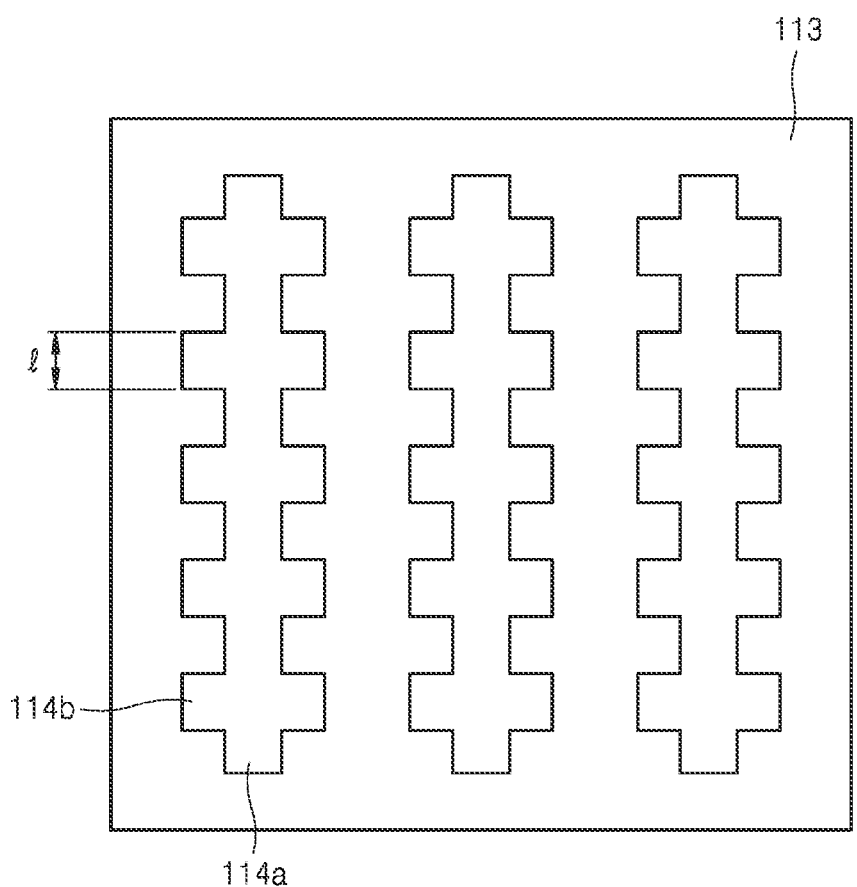
FIG. 15 is a plan view of a structure of a phased array device with antenna compensation design according to an example embodiment.

While antenna compensation design conducted by adjusting the interval g between the antenna layers 114 and the width w of the antenna layer 114 has been described above, the antenna compensated design may also be made by modifying a shape of the antenna layer 114. For example, FIG. 15 is a plan view of a structure of a phased array device with antenna compensation design. Referring to FIG. 15, the antenna layer 114 may have a fishbone shape including a first antenna portion 114a extending in a first direction and a plurality of second antenna portions 114b arranged in the first direction and extending in a second direction from the first antenna portion 114a. In this example, critical coupling conditions may be met by adjusting a width of the first antenna portion 114a, an interval between the antenna layers 114 or a length l of the second antenna portion 114b in the first direction. For example, the length l of the second antenna portion 114b in the first direction may be selected such that an intensity of directly reflected light by the phased array device 110 with respect to an incidence angle of incident light with respect to a normal of a surface of a reflective surface of the phased array device 110 is equal to an intensity of resonated scattered light.

Figure 16:
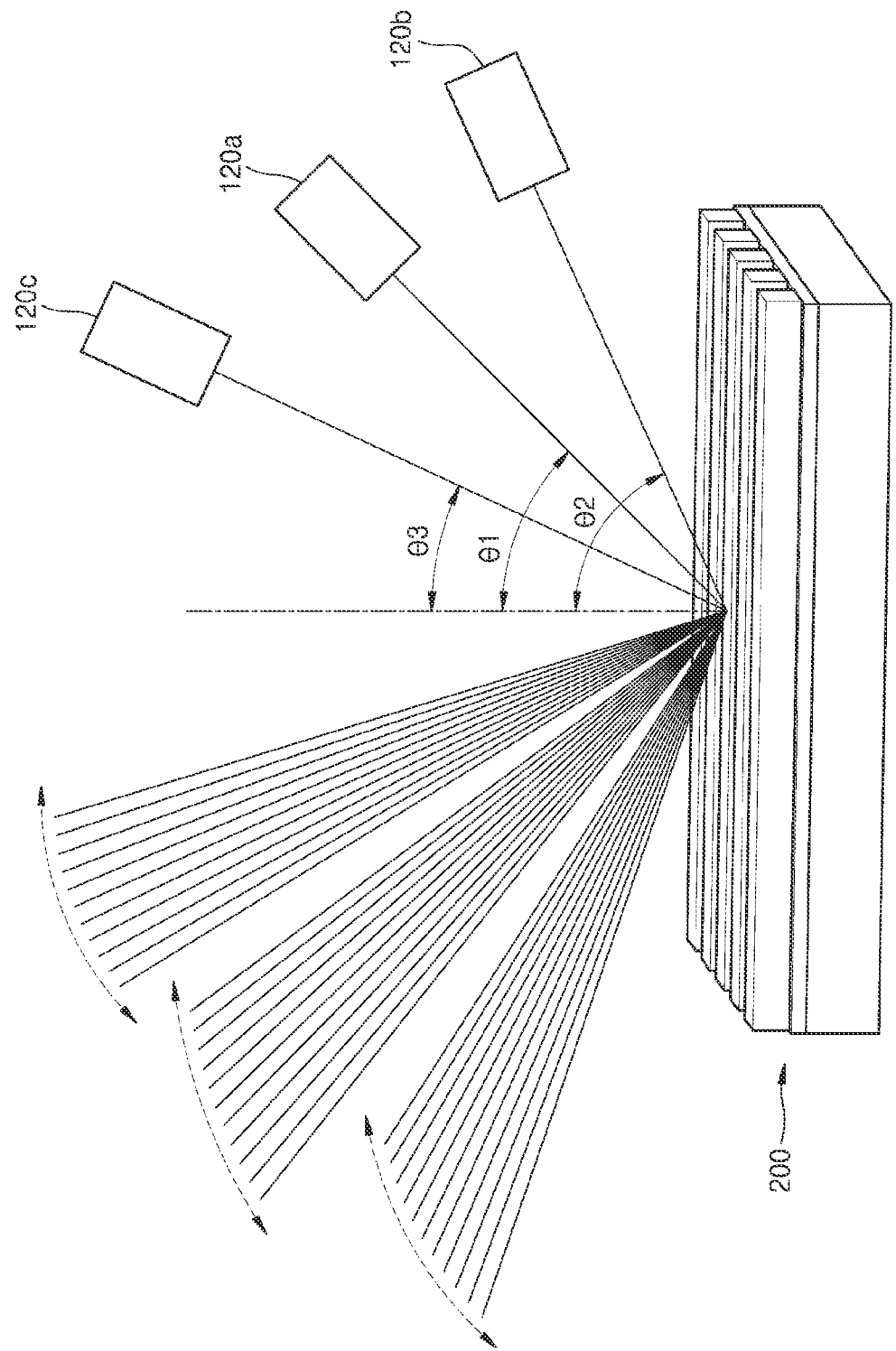
FIG. 16 is a perspective view illustrating a schematic structure and operation of a beam scanning apparatus according to an example embodiment.

FIG. 16 is a perspective view illustrating a schematic structure and operation of a beam scanning apparatus 200 according to an example embodiment. The beam scanning apparatus 200 illustrated in FIG. 16 may include a plurality of light sources 120a, 120b, and 120c providing light and a reflective phased array device 110 reflecting the light emitted from the plurality of light sources 120a, 120b, and 120c and electrically adjusting a reflection angle of reflected light. In addition, the plurality of light sources 120a, 120b, and 120c may include a first light source 120a providing light incident on the phased array device 110 at a first incidence angle θ1 with respect to a surface normal of a reflective surface of the phased array device 110, a second light source 120b providing light incident on the phased array device 110 at a second incidence angle θ2 different from the first incidence angle θ1, and a third light source 120c providing light incident on the phased array device 110 at a third incidence angle θ3 different from the first and second incidence angles θ1 and θ2.

Light emitted from the first through third light sources 120a, 120b, and 120c all proceeds in a direction parallel to a first direction in which the antenna layer 114 of the phased array device 110 extends and is incident on a surface of the phased array device 110 at an angle, and only an incidence angle with respect to the phased array device 110 differs among the first through third light sources 120a, 120b, and 120c. As the incidence angle with respect to the phased array device 110 differs, lights emitted from the first through third light sources 120a, 120b, and 120c are reflected by the phased array device 110 at different reflection angles, but may be identically scanned by the phased array device 110 in an azimuth direction. Accordingly, while only one-dimensional beam scanning in an azimuth direction may be performed in the example embodiment illustrated in FIG. 1, in the example embodiment illustrated in FIG. 16, two-dimensional beam scanning may be conducted in an azimuth direction and in an altitude angle direction by using the first through third light sources 120a, 120b, and 120c. The first through third light sources 120a, 120b, and 120c may emit light simultaneously or sequentially.

Figure 17:
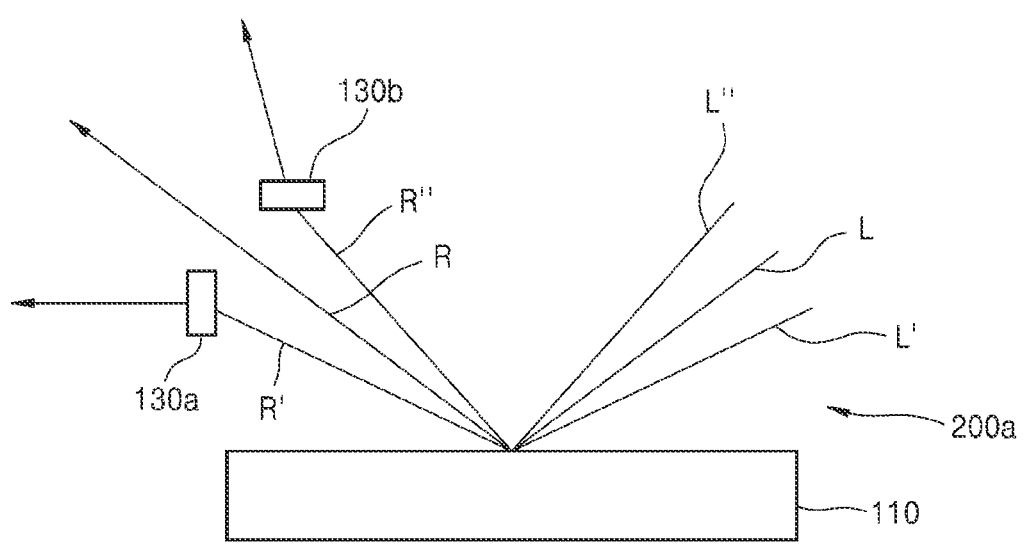
FIG. 17 is a cross-sectional view illustrating a schematic structure and operation of a beam scanning apparatus according to an example embodiment.

FIG. 17 is a cross-sectional view illustrating a schematic structure and operation of a beam scanning apparatus 200a according to an example embodiment. Referring to FIG. 17, the beam scanning apparatus 200a may include optical elements 130a and 130b that further refract a travelling direction of reflected light into an altitude angle direction. The other elements of the beam scanning apparatus 200a may be identical to those of the beam scanning apparatus 200 illustrated in FIG. 16. For example, the optical elements 130a and 130b may include a first optical element 130a arranged on an optical path of reflected light R' such that the reflected light R' generated by reflecting incident light L' emitted from the second light source 120b is reflected by the phased array device 110 reduces an altitude angle direction of the reflected light R' and a second optical element 130b arranged on an optical path of reflected light R" such that the reflected light R" generated by reflecting incident light L" emitted from the third light source 120c is reflected by the phased array device 110 increases an altitude angle direction of the reflected light R".

Also, when the first through third light sources 120a, 120b, and 120c are arranged such that all light emitted from the first through third light sources 120a, 120b, and 120c is within a relatively narrow range of incidence angle satisfying the critical coupling conditions, two-dimensional beam scanning may be conducted within a relatively broad altitude angle range by varying an altitude angle direction of reflected light by using the first and second optical elements 130a and 130b. For example, the first and second optical elements 130a and 130b may include a prism, a cylindrical lens, a wedge-shaped optical plate, a diffractive optical element, or the like.

Figure 18:
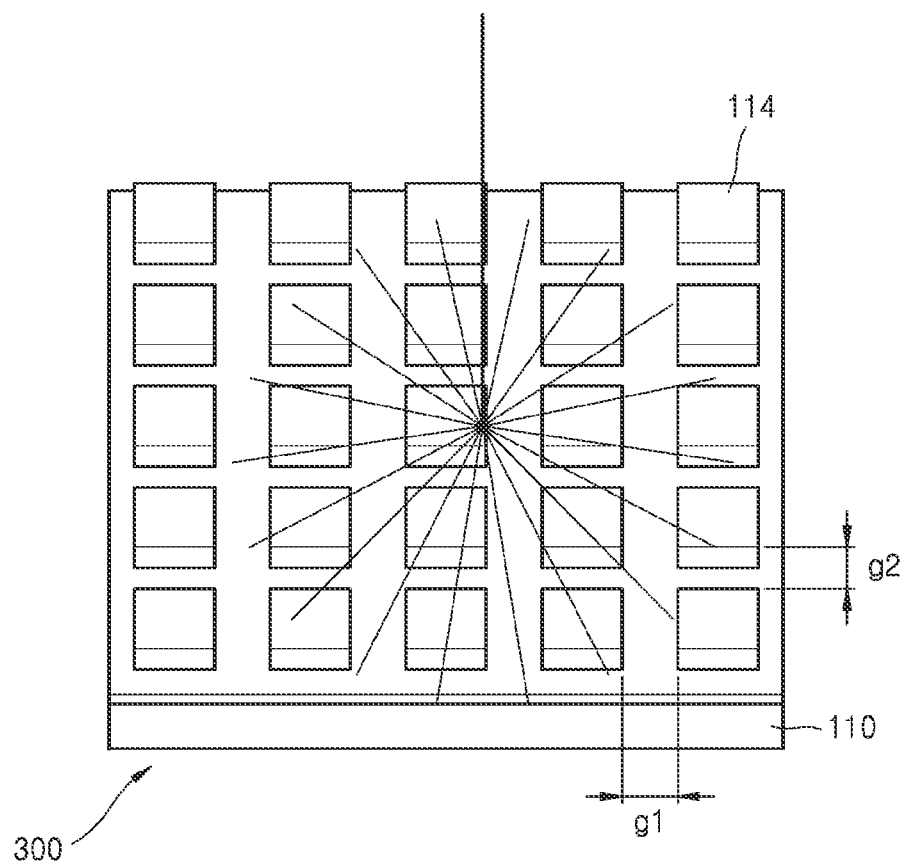
FIGS. 18 and 19 are perspective views illustrating a schematic structure and operation of a beam scanning apparatus according to an example embodiment.
Figure 19:
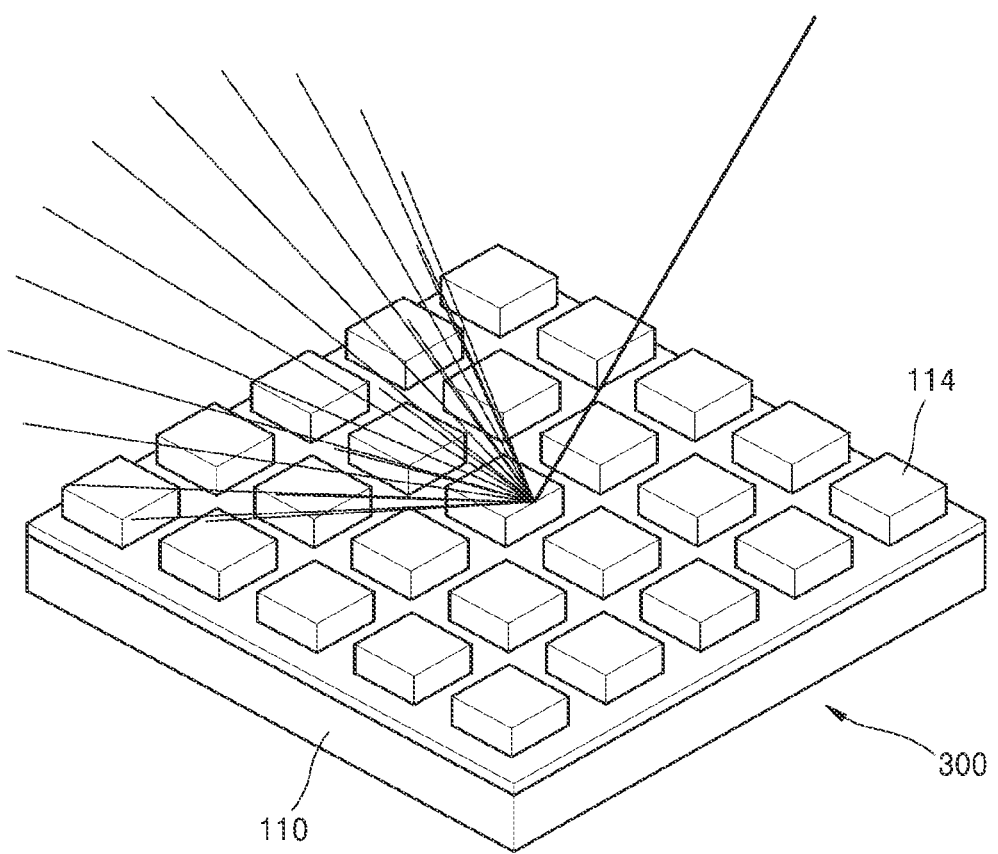

FIGS. 18 and 19 are perspective views illustrating a schematic structure and operation of a beam scanning apparatus 300 according to an example embodiment. Referring to FIGS. 18 and 19, a phased array device 110 of the beam scanning apparatus 300 may include a plurality of antenna resonators that are arranged two-dimensionally. Accordingly, a plurality of antenna layers 114 may be arranged two-dimensionally on a reflective surface of the phased array device 110. For example, the plurality of antenna layers 114 may be arranged at a first interval g1 in a first direction and at a second interval g2 in a second direction perpendicular to the first direction. The first interval g1 and the second interval g2 between the plurality of antenna layers 114 may be respectively selected to satisfy critical coupling conditions with respect to the first and second directions. For example, the first interval g1 and the second interval g2 between the plurality of antenna layers 114 may be selected such that an intensity of directly reflected light by the phased array device 110 is equal to an intensity of resonated scattered light. By using the beam scanning apparatus 300, two-dimensional beam scanning may be conducted with respect to one ray of incident light that is incident at an angle through combination of voltages applied to the plurality of antenna resonators arranged two-dimensionally.

Figure 20:
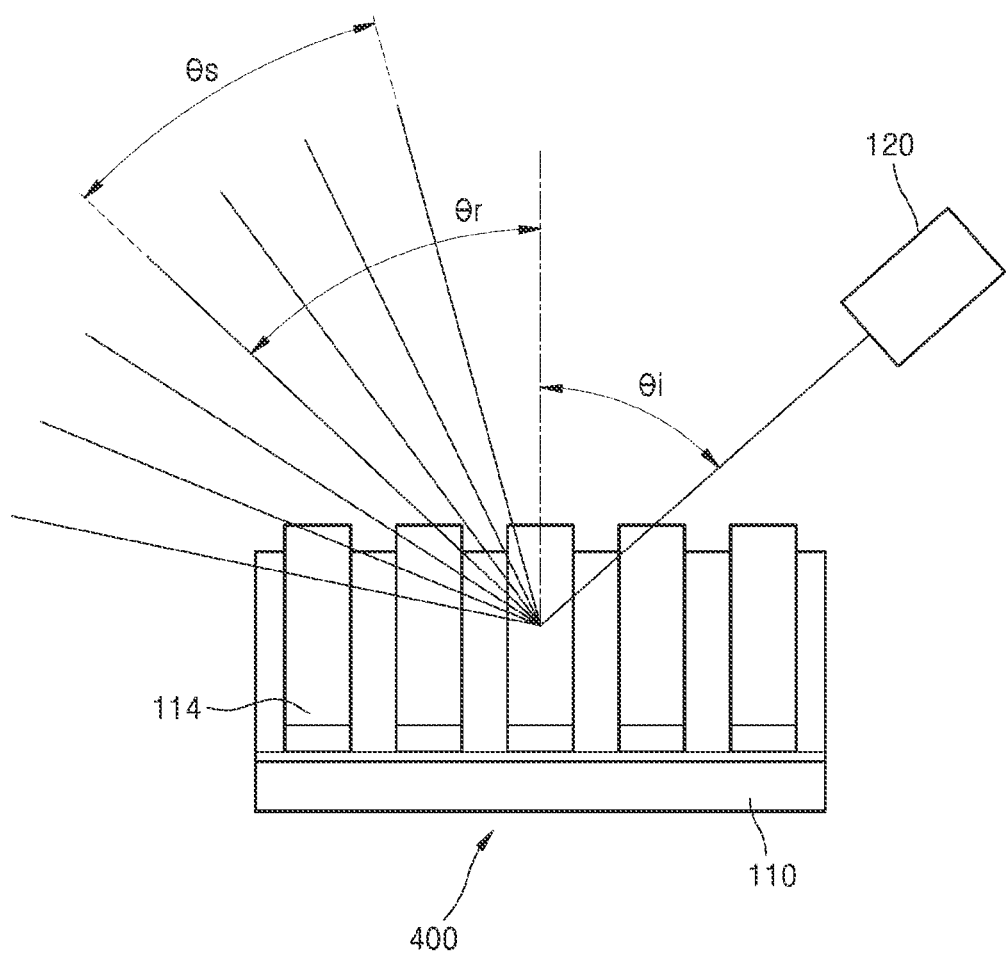
FIGS. 20 and 21 are perspective views illustrating a schematic structure and operation of a beam scanning apparatus according to an example embodiment.
Figure 21:
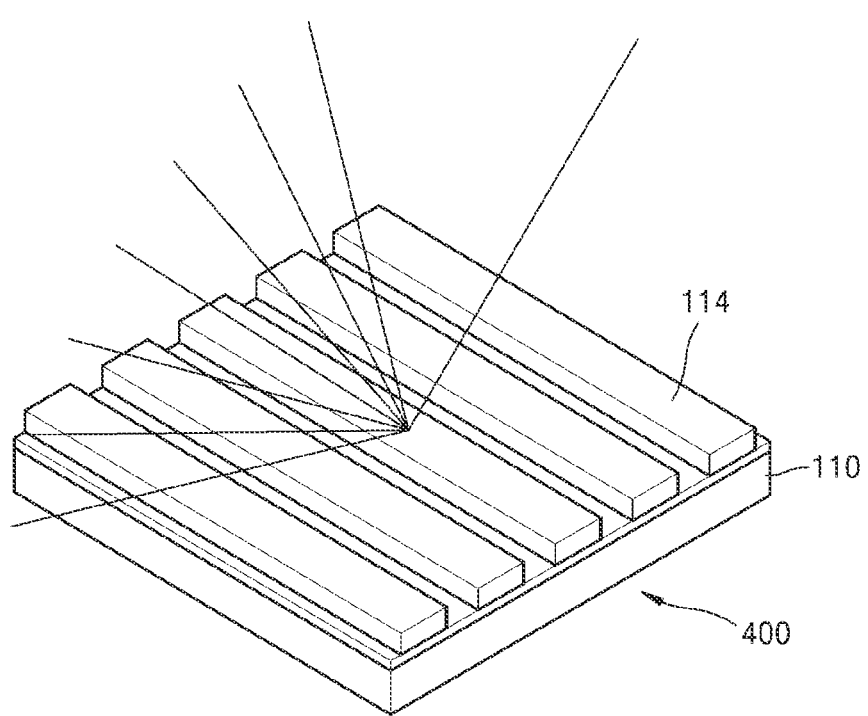

FIGS. 20 and 21 are perspective views illustrating a schematic structure and operation of a beam scanning apparatus 400 according to an example embodiment. The beam scanning apparatus 400 illustrated in FIGS. 20 and 21 has a similar structure as the beam scanning apparatus 100 illustrated in FIG. 1, but a light source 120 of the beam scanning apparatus 400 is arranged perpendicularly to an arrangement direction of the light source 120 of the beam scanning apparatus 100 illustrated in FIG. 1. Accordingly, incident light emitted from the light source 120 may proceed in a second direction perpendicular to a first direction in which each of the antenna layers 114 extends and may be incident on a surface of the phased array device 110 at an angle. For example, the light source 120 and the phased array device 110 are arranged such that a travelling direction of incident light incident from the light source 120 to the phased array device 110 is parallel to the second direction.

According to the example embodiment, beam scanning may be performed on a plane perpendicular to the surface of the phased array device 110. For example, a travelling direction of reflected light may be controlled in an altitude angle direction. Accordingly, a scanning plane including reflected lights reflected by the phased array device 110 at different angles is formed perpendicularly to the first direction. According to the example embodiment, a beam scanning area and incident light are placed on a single plane, and thus, the phased array device 110 may be more easily integrated.

When a reflection angle of reflected light is too great that the reflected light overlaps and mixes with incident light, accurate detection may not be performed. Accordingly, to prevent or reduce an excessive increase in the reflection angle of the reflected light by the phased array device 110 that reduces accuracy in detection, for example, when an incidence angle of incident light with respect to a normal of a reflective surface of the phased array device 110 is θi and a reflection angle of central reflected light of when no voltage is applied to the phased array device 110 is θr, the phased array device 110 may be configured or controlled such that a maximum steering angle θs of the phased array device 110 with respect to the central reflected light satisfies θr−θs>−θi.

The maximum steering angle θs is obtained when phase shifts of 0 degrees and 180 degrees of reflected light reflected by the plurality of antenna layers 114 arranged in the phased array device 110 are repeated. For example, when the phased array device 110 is operated such that a phase shift of reflected light by a first antenna layer is 0 degree, a phase shift of reflected light by a second antenna layer is 180 degrees, a phase shift of reflected light by a third antenna layer is 0 degrees again, and a phase shift of reflected light by a fourth antenna layer is 180 degrees again, a maximum reflection angle of reflected light by the phased array device 110 is obtained. Accordingly, a period of a phase shift pattern is double an antenna period p of the phased array device 110. In this example, a first-order diffraction angle by the phased array device 110, that is, a maximum steering angle θs, may be expressed as θs=sin$^{-1}$(λ/2p), where λ is a wavelength of the incident light. In addition, a reflection angle θr of central reflected light is equal to an incidence angle θi of incident light, and thus, θr=θi and θi−θs>−θi, thereby establishing θi>0.5θs=0.5 sin$^{-1}$(λ/2p).

The beam scanning apparatuses 100, 200, 300, and 400 may be included in an optical apparatus, for example, a three-dimensional sensor such as a light detection and ranging (LiDAR) sensor for vehicles, or a depth sensor used in a three-dimensional camera to enhance precision of the optical apparatus. For example, FIG. 22 is a block diagram illustrating a schematic structure of an optical apparatus 1000 according to an example embodiment.

Figure 22:
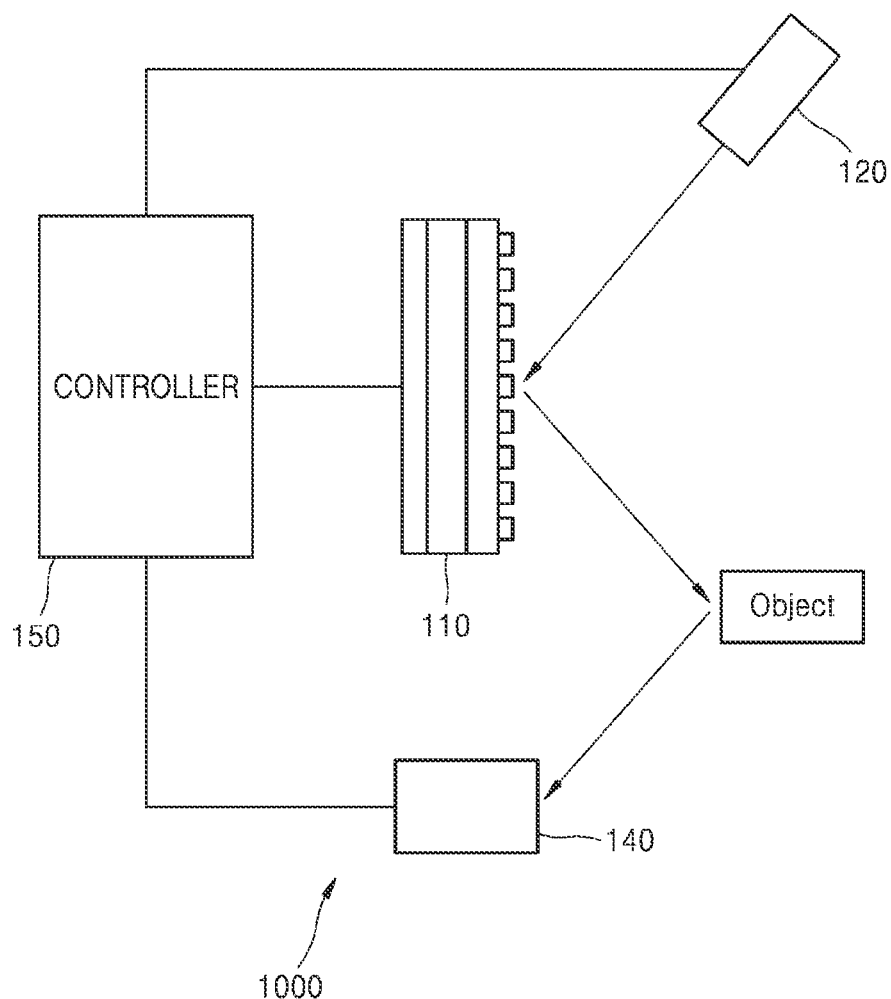
FIG. 22 is a block diagram illustrating a schematic structure of an optical apparatus according to an example embodiment.

Referring to FIG. 22, the optical apparatus 1000 according to an example embodiment may include a light source 120 providing light, a reflective phased array device 110 reflecting light from the light source 120 and electrically adjusting a reflection angle of reflected light, a light detector 140 detecting light emitted from the light source 120 and reflected by an external object, and a controller or processor 150 calculating information about the external object based on a measurement result of the light detector 140. The controller 150 may control operations of the phased array device 110, the light source 120, and the light detector 140. For example, the controller 150 may control an on/off operation of the light source 120 and the light detector 140 and a beam scanning operation of the phased array device 110. The optical apparatus 1000 may periodically irradiate light to various areas nearby by using the beam scanning apparatus 100, 200, 300 or 400 to acquire information about objects at nearby multiple locations. According to the beam scanning apparatus 100, 200, 300, or 400 according to example embodiments, incident light and reflected light may not overlap with each other in the phased array device 110, and thus, the optical apparatus 1000 may extract a more accurate information about the external object.

In addition, the optical apparatus 1000 may be used, other than in three-dimensional sensors or depth sensors, for LiDAR for robots, LiDAR for drones, security-purpose intruder surveillance systems, subway screen door obstacle detection systems, face recognition sensors, motion recognition and object profiling devices, or the like.

Figure 23:
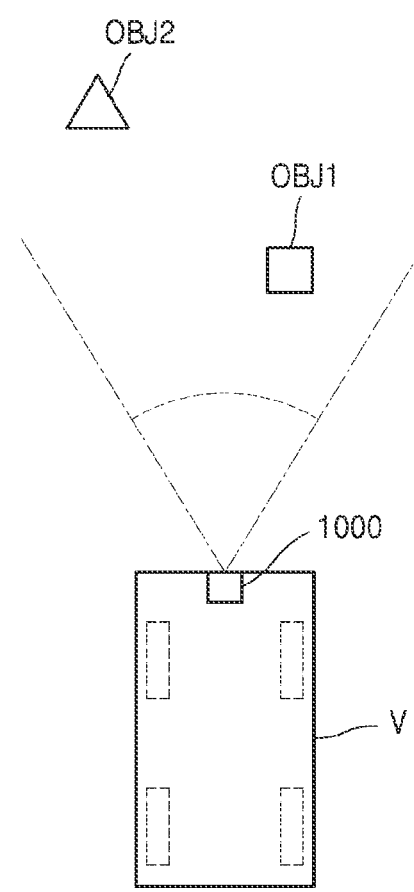
FIG. 23 is a schematic view illustrating an optical apparatus according to an example embodiment used for a LiDAR apparatus for vehicles.

For example, FIG. 23 is a view illustrating a schematic structure of an optical apparatus 1000 according to an example embodiment, used for LiDAR for vehicles. Referring to FIG. 23, the optical apparatus 1000 may be mounted in a vehicle V and detect various objects OBJ1 and OBJ2 in front the vehicle V by scanning a beam in a front area where the vehicle V is travelling. When the optical apparatus 1000 is used for LiDAR for vehicles, the optical apparatus 1000 may calculate information such as a distance with respect to the objects OBJ1 and OBJ2 in front of or at the back of the vehicle V or relative speeds or azimuth positions of the objects OBJ1 and OBJ2 or the like. For example, the controller 150 may determine distances with respect to the objects OBJ1 and OBJ2 by using a time difference between a time when light is emitted from the light source 120 and a time when the light detector 140 has detected the light, and may detect azimuth angle positions of the objects OBJ1 and OBJ2 based on a location where light is irradiated by using the beam scanning apparatuses 100, 200, 300, and 400. In addition, the controller 150 may determine a relative speed with respect to the objects OBJ1 and OBJ2 based on a variation in the time difference between the time when light is emitted from the light source 120 and the time when the light detector 140 detected the light. In addition, when the optical apparatus 1000 is a distance sensor of a three-dimensional camera, the controller 150 may estimate distance information about distances with respect to various subjects within a field of view of the camera.

It should be understood that example embodiments described herein should be considered in a descriptive sense only and not for purposes of limitation. Descriptions of features or aspects within each example embodiment should typically be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A beam scanning apparatus comprising:
   at least one light source configured to emit light; and
   a reflective phased array device configured to reflect the light emitted from the at least one light source and incident on the reflective phased array device, and electrically adjust a reflection angle of reflected light reflected by the reflective phased array device based on an applied voltage from a voltage source,
   wherein the reflective phased array device comprises an electrode layer, an active layer disposed on the electrode layer, an insulating layer disposed on the active layer, and a plurality of antenna layers disposed on the insulating layer,
   wherein each of the plurality of antenna layers extends in a first direction and the plurality of antenna layers are disposed at predetermined intervals in a second direction perpendicular to the first direction,
   wherein the at least one light source and the reflective phased array device are disposed such that the light is incident on the reflective phased array device at an incidence angle with respect to a normal of a reflective surface of the reflective phased array device in a direction parallel to the second direction,
   wherein, when the incidence angle is θi and a reflection angle of central reflected light with respect to the normal of the reflective surface of the reflective phased array device is θr, the reflective phased array device is configured such that a maximum steering angle θs of the reflective phased array device with respect to the central reflected light satisfies θr−θs>−θi, and
   wherein the central reflected light is light reflected by the reflective phased array device when no voltage is applied to the reflective phased array device.

2. The beam scanning apparatus of claim 1, wherein the at least one light source and the reflective phased array device are disposed such that the light incident on the reflective phased array device and the reflected light reflected by the reflective phased array device do not overlap each other.

3. The beam scanning apparatus of claim 1, wherein the electrode layer comprises a conductive metal configured to reflect the light emitted from the at least one light source.

4. The beam scanning apparatus of claim 1, wherein each of the plurality of antenna layers has a fishbone shape and comprises a first antenna portion extending in the first direction and a plurality of second antenna portions disposed along the first direction and extending in the second direction from the first antenna portion.

5. The beam scanning apparatus of claim 4,
wherein the reflected light comprises directly reflected light that is directly reflected by the reflective phased array device and resonated scattered light that is generated based on resonance in each of the plurality of antenna layers of the reflective phased array device, and
wherein a length of each of the plurality of second antenna portions in the first direction is determined such that an intensity of the directly reflected light is substantially equal to an intensity of the resonated scattered light.

6. The beam scanning apparatus of claim 5, wherein the length of each of the plurality of second antenna portions in the first direction is determined based on the incidence angle of the light.

7. The beam scanning apparatus of claim 1,
wherein the reflected light comprises directly reflected light that is directly reflected by the reflective phased array device and resonated scattered light that is generated based on resonance in each of the plurality of antenna layers of the reflective phased array device,
wherein at least one of an interval between the plurality of antenna layers in the second direction and an antenna period is determined such that an intensity of the directly reflected light is substantially equal to an intensity of the resonated scattered light, and
wherein the antenna period is a length at which the plurality of antenna layers are repeated in the second direction.

8. The beam scanning apparatus of claim 7, wherein at least one of the interval between the plurality of antenna layers and the antenna period is determined based on the incidence angle of the light incident on the reflective phased array device.

9. The beam scanning apparatus of claim 7, wherein at least one of the interval between the plurality of antenna layers and the antenna period is less than an interval between the plurality of antenna layers or an antenna period corresponding to light perpendicularly incident on the reflective phased array device.

10. The beam scanning apparatus of claim 7, wherein as the incidence angle of the light incident on the reflective phased array device increases, at least one of the interval between the plurality of antenna layers or the antenna period decreases.

11. The beam scanning apparatus of claim 7, wherein at least one of an interval between the plurality of antenna layers and the antenna period is determined such that the intensity of the directly reflected light is substantially equal to the intensity of the resonated scattered light based on the applied voltage to the reflective phased array device and a wavelength of the light incident on the reflective phased array device.

12. The beam scanning apparatus of claim 1, wherein the at least one light source and the reflective phased array device are disposed such that a travelling direction of the light incident on the reflective phased array device is parallel to the first direction.

13. The beam scanning apparatus of claim 12, wherein the at least one light source comprises:
a first light source configured to emit first incident light that is incident on the reflective phased array device at a first incidence angle with respect to the normal of the reflective surface of the reflective phased array device; and
a second light source configured to emit second incident light that is incident on the reflective phased array device at a second incidence angle different from the first incidence angle.

14. The beam scanning apparatus of claim 13, wherein first reflected light generated by the first incident light reflected by the reflective phased array device travels at a first reflection angle with respect to the normal of the reflective surface of the reflective phased array device, and second reflective light generated by the second incident light reflected by the reflective phased array device travels at a second reflection angle, different from the first reflection angle, with respect to the normal of the reflective surface of the reflective phased array device, and
wherein the beam scanning apparatus further comprises an optical element disposed on a travelling path of the second reflective light and configured to change a travelling direction of the second reflective light.

15. The beam scanning apparatus of claim 1, wherein the at least one light source and the reflective phased array device are disposed such that the reflective phased array device is further configured to reflect the light where a scanning plane comprising reflected light reflected by the reflective phased array device at different angles is perpendicular to the first direction.

16. A beam scanning apparatus comprising:
at least one light source configured to emit light; and
a reflective phased array device configured to reflect the light emitted from the at least one light source and incident on the reflective phased array device, and electrically adjust a reflection angle of reflected light reflected by the reflective phased array device based on an applied voltage from a voltage source,
wherein the reflective phased array device comprises an electrode layer, an active layer disposed on the electrode layer, an insulating layer disposed on the active layer, and a plurality of antenna layers disposed on the insulating layer,
wherein each of the plurality of antenna layers extends in a first direction and the plurality of antenna layers are disposed at predetermined intervals in a second direction perpendicular to the first direction,
wherein the at least one light source and the reflective phased array device are disposed such that the light is incident on the reflective phased array device at an incidence angle with respect to a normal of a reflective surface of the reflective phased array device in a direction parallel to the second direction, and
wherein, when an interval between the plurality of antenna layers in the second direction or an antenna period is p, the incidence angle is $\theta_i$, where $\lambda$ is a wavelength of the light, the reflective phased array device is configured such that a maximum steering angle $\theta_s$ satisfies $\theta_i > 0.5\ \theta_s$ and $\theta_s = \sin^{-1}(\lambda/2p)$.

17. A beam scanning apparatus comprising:
at least one light source configured to emit light; and
a reflective phased array device configured to reflect the light emitted from the at least one light source and incident on the reflective phased array device, and electrically adjust a reflection angle of reflected light reflected by the reflective phased array device based on an applied voltage from a voltage source,
wherein the reflective phased array device comprises a plurality of antenna resonators respectively comprising an electrode layer and an active layer, each of the plurality of antenna resonators being independently driven, wherein the at least one light source and the reflective phased array device are disposed such that the light is incident on the reflective phased array device at an incidence angle with respect to a normal of a reflective surface of the reflective phased array device, wherein the reflected light comprises directly reflected light that is directly reflected by the reflective phased array device and resonated scattered light that is generated based on resonance in each of the plurality of antenna resonators of the reflective phased array device, and wherein an intensity of the directly reflected light is substantially equal to an intensity of the resonated scattered light.

18. The beam scanning apparatus of claim 17, wherein each of the plurality of antenna resonators further comprises:
an insulating layer disposed on the active layer opposite to the electrode layer; and
an antenna layer disposed on the insulating layer opposite to the active layer.

19. The beam scanning apparatus of claim 18, wherein the antenna layer has a fishbone shape and comprises a first antenna portion extending in a first direction and a plurality of second antenna portions disposed along the first direction and extending in a second direction from the first antenna portion, wherein a length of each of the plurality of second antenna portions in the first direction is determined such that the intensity of the directly reflected light is substantially equal to the intensity of the resonated scattered light, and wherein the length of each of the plurality of second antenna portions in the first direction is determined based on the incidence angle of the light.

20. The beam scanning apparatus of claim 18, wherein the antenna layer comprises a plurality of antenna layers,
wherein each of the plurality of antenna layers extends in a first direction and are disposed at predetermined intervals in a second direction perpendicular to the first direction,
wherein at least one of an interval between the plurality of antenna layers in the second direction and an antenna period is determined such that the intensity of the directly reflected light is substantially equal to the intensity of the resonated scattered light, and wherein the antenna period is a length at which the plurality of antenna layers are repeated in the second direction, and wherein at least one of the interval between the plurality of antenna layers and the antenna period is determined based on the incidence angle of the light incident on the reflective phased array device.

21. A beam scanning apparatus comprising:
at least one light source configured to emit light; and
a reflective phased array device configured to reflect the light emitted from the at least one light source and incident on the reflective phased array device, and electrically adjust a reflection angle of reflected light reflected by the reflective phased array device based on an applied voltage from a voltage source, the reflective phased array device comprising a plurality of antenna layers, wherein the reflective phased array device comprises a plurality of antenna resonators respectively comprising an electrode layer and an active layer, each of the plurality of antenna resonators being independently driven, wherein the at least one light source and the reflective phased array device are disposed such the light is incident on the reflective phased array device at an incident angle with respect to a normal of a reflective surface of the reflective phased array device, wherein the reflected light comprises directly reflected light that are reflected by the reflective phased array device and resonated scattered light that are generated based on resonance in each of the plurality of antenna resonators of the reflective phased array device, and wherein at least one of an interval between the plurality of antenna layers or an antenna period is determined such that an intensity of the directly reflected light is substantially equal to an intensity of the resonated scattered light.

* * * * *